(12) United States Patent
Haubrich et al.

(10) Patent No.: US 11,052,737 B2
(45) Date of Patent: Jul. 6, 2021

(54) CONSTRUCTION MACHINE, IN PARTICULAR A ROAD CONSTRUCTION MACHINE, AND METHOD FOR ADJUSTING A FLEXIBLE LATERAL WALL ELEMENT OF A LATERAL WEATHER PROTECTION DEVICE OF A CONSTRUCTION MACHINE

(71) Applicant: BOMAG GmbH, Boppard (DE)

(72) Inventors: Thomas Haubrich, Boppard (DE); Stefan Kuhn, Boppard (DE)

(73) Assignee: BOMAG GmbH, Boppard (DE)

( * ) Notice: Subject to any disclaimer, the term of this patent is extended or adjusted under 35 U.S.C. 154(b) by 242 days.

(21) Appl. No.: 16/212,986

(22) Filed: Dec. 7, 2018

(65) Prior Publication Data
US 2019/0176598 A1 Jun. 13, 2019

(30) Foreign Application Priority Data

Dec. 8, 2017 (DE) ...................... 10 2017 011 326.2

(51) Int. Cl.
*B60J 7/16* (2006.01)
*E06B 9/08* (2006.01)
*E06B 9/40* (2006.01)

(52) U.S. Cl.
CPC ........... *B60J 7/1628* (2013.01); *B60J 7/1642* (2013.01); *E06B 9/08* (2013.01); *E06B 9/40* (2013.01); *E01C 2301/30* (2013.01)

(58) Field of Classification Search
CPC .... B60P 3/34; B60P 3/341; B60P 3/42; B62D 33/08; B62D 53/067; B60J 7/1628;
(Continued)

(56) References Cited

U.S. PATENT DOCUMENTS 3,492,041 A * 1/1970 Logan ...................... B60P 3/34
296/173
4,174,133 A * 11/1979 Brockhaus .............. B60P 3/341
296/210
(Continued)

FOREIGN PATENT DOCUMENTS

DE 1986688 U 6/1968
DE 4404415 A1 8/1995
(Continued)

OTHER PUBLICATIONS

German Patent and Trademark Office, Search Report, Application No. 10 2017 011 326.2, dated Sep. 12, 2018 (10 pages).

*Primary Examiner* — Hilary L Gutman
(74) *Attorney, Agent, or Firm* — Wood Herron & Evans LLP

(57) ABSTRACT

The present invention relates to a construction machine, in particular a road construction machine, comprising a machine frame, an operator platform arranged on said machine frame with an operator work-place, an operator platform roof, which is, in particular, height-adjustable, and a vertically extending lateral weather protection device for an operator located on the operator platform. The present invention also relates to a method for adjusting a flexible lateral wall element adjustable between a pull-in position and a pull-out position, which is part of a lateral weather protection device of a construction machine.

21 Claims, 5 Drawing Sheets

(58) Field of Classification Search
CPC . B60J 7/1642; B60J 7/042; E06B 9/08; E06B 9/40; E01C 2301/30
USPC ......... 296/26.04, 100.11, 165, 172, 173, 176
See application file for complete search history.

(56) References Cited

U.S. PATENT DOCUMENTS

| | | | | |
|---|---|---|---|---|
| 4,603,901 | A * | 8/1986 | McIntosh | B60P 3/34 296/165 |
| 6,152,517 | A * | 11/2000 | Steadman | B60J 7/068 296/100.11 |
| 7,147,030 | B2 * | 12/2006 | Dalle Nogare | E06B 9/56 160/315 |
| 8,764,098 | B2 * | 7/2014 | Markley | B60J 11/04 296/136.07 |
| 8,882,170 | B2 * | 11/2014 | Brown, Jr. | B62D 25/04 296/79 |
| 10,046,628 | B1 * | 8/2018 | Fulton | B60J 7/042 |
| 10,457,128 | B2 * | 10/2019 | Sullivan | B60J 7/1614 |
| 10,611,219 | B2 * | 4/2020 | Trinier | B60J 7/1614 |
| 10,890,337 | B1 * | 1/2021 | Arbogast | F24C 15/36 |
| 2013/0062905 | A1 | 3/2013 | Held | |
| 2014/0225417 | A1 * | 8/2014 | Meinders | E02F 5/08 299/39.4 |
| 2015/0102637 | A1 * | 4/2015 | Lemke | B62D 33/0621 296/190.08 |
| 2018/0354351 | A1 * | 12/2018 | Buschmann | E02F 9/0833 |
| 2019/0119865 | A1 * | 4/2019 | Weber | E01C 19/006 |

FOREIGN PATENT DOCUMENTS

| | | |
|---|---|---|
| DE | 102005044173 A1 | 3/2007 |
| DE | 102008047583 A1 | 4/2010 |
| DE | 102012022879 A1 | 2/2014 |
| DE | 102013005832 A1 | 10/2014 |
| DE | 102013006105 A1 | 10/2014 |
| DE | 102015118492 A1 | 5/2017 |
| JP | H0418077 U | 2/1992 |
| JP | H0452105 U | 5/1992 |
| WO | 2011119715 A2 | 9/2011 |

* cited by examiner

CONSTRUCTION MACHINE, IN PARTICULAR A ROAD CONSTRUCTION MACHINE, AND METHOD FOR ADJUSTING A FLEXIBLE LATERAL WALL ELEMENT OF A LATERAL WEATHER PROTECTION DEVICE OF A CONSTRUCTION MACHINE

CROSS-REFERENCE TO RELATED APPLICATION

The present application claims priority under 35 U.S.C. § 119 of German Patent Application No. 102017011326.2, filed Dec. 8, 2017, the disclosure of which is hereby incorporated herein by reference in its entirety.

FIELD OF THE INVENTION

The present invention relates to a construction machine, in particular a road milling machine, with a lateral weather protection device, as well as to a method for adjusting a flexible lateral wall element of a lateral weather protection device of such a construction machine.

BACKGROUND OF THE INVENTION

Construction machines, in particular self-propelled construction machines, frequently comprise an operator platform from which the construction machine is operated, in particular, for example, for entering driving and/or work commands, by an operator. Such construction machines, in particular road construction machines, are frequently employed in a wide range of weather conditions. The operator cabs which are frequently used for this reason to protect the driver are disadvantageous in that they require a relatively large amount of installation space and also have a complex structure, which makes them expensive. It is further known to provide operator platforms which are open towards the sides and frequently comprise an operator platform roof. Such open operator platforms actually omit a cab which completely surrounds the respective operator. In order to still enable improved weather protection for the driver, flexible lateral wall elements are already known for such open operator platforms, which may be rolled in and out and fixed manually by the driver as needed. This is described, for example, in DE102013005832A1. A disadvantage of this solution is the relatively low handling comfort for the driver.

Based on the aforesaid, an object of the present invention is to provide a solution for a weather protection device for a driver located in an open operator platform which is as cost-effective and at the same time convenient to use as possible.

SUMMARY OF THE INVENTION

Elements of a construction machine according to one embodiment of the present invention, in particular a road construction machine and more particularly a road milling machine, consist in a machine frame, an operator platform arranged on said machine frame with an operator workplace, with an operator platform roof, which is, in particular, height-adjustable, and with a lateral weather protection device for an operator located on the operator platform. Said lateral weather protection device extends vertically on at least one side of the operator platform. The machine frame constitutes an essential support structure of the construction machine. It is supported, in particular, by a number of traveling devices, for example wheels or crawler tracks, which are preferably height-adjustable. The construction machine according to one embodiment of the present invention is further preferably self-propelled and comprises a drive engine, in particular a diesel combustion engine. Further provided is at least one working device, in the case of a road milling machine a milling device with a milling drum which is rotatable horizontally and transversely to the working direction. Such a road construction machine of the road milling machine type, to which the present invention relates, in particular, is disclosed, for example, in DE102012022879A1, which is incorporated herein by reference. The operator platform refers to a device of the construction machine from which an operator can control the working and/or milling operation of the construction machine. For this, the operator platform comprises, for example, suitable input devices such as control levers and/or operating buttons, as well as display devices. In addition to an operator platform floor, the operator platform frequently also has at least one driver seat arranged thereon. In order to protect the driver on the operator platform against, for example, the blazing sun or rain from above, the operator platform frequently comprises an operator platform roof, which is, in particular, height-adjustable in the vertical direction. It is further already known for some types of construction machines to additionally protect the driver on the operator platform at least partially towards one side, for example in windy working conditions. To this end, a lateral weather protection device is provided which extends on at least one side of the operator platform in the vertical direction between the operator platform roof and, for example, the operator platform floor or a lateral wall of the operator platform. The sides of the operator platform in this case comprise the right and left sides in the main working direction of the construction machine and, additionally, or alternatively, the front and/or rear sides.

According to one embodiment of the present invention, provision is now made that the lateral weather protection device comprises a flexible lateral wall element and a pull-in device, that the flexible lateral wall element is adjustable between a pull-in position and a pull-out position with the aid of the pull-in-device, that the pull-in device includes a driven adjusting device for automatic adjustment of the lateral weather protection device from a pull-out position in the direction of the pull-in position, and that the pull-in device includes a releasable holding device which, when in a holding position, is designed to hold the flexible lateral wall element in the pull-out position. The flexible lateral wall element is ideally a wind- and rainproof flat element that can be rolled in and out, similar, for example, to a canvas, which can be used to cover at least a part of a side of the operator platform and can, at the same time, be folded, more specifically, in particular, rolled up, to a space-saving shape. To this end, the flexible lateral wall element consists, in particular, of a plastic material, in particular plasticized PVC. When the flexible lateral wall element is folded, in particular rolled up, and is thus in its space-saving configuration, this position is herein referred to as the pull-in position. In the pull-in position, the flexible lateral wall element does thus not provide lateral protection for the driver on the operator platform and is ideally stowed in a space-saving manner. The pull-in position thus, in particular, also designates a stowage position of the flexible lateral wall element. The flexible lateral wall element can be adjusted from this pull-in position to a pull-out position. According to one embodiment of the present invention, it is now intended, in particular, that there is not only one single pull-out position, but instead the extent to which the flexible lateral wall element is folded out, in particular rolled out, from the pull-in position to the pull-out position is variable and, in particular, depends, for example, on the current height position of the operator platform roof where the operator platform roof is height-adjustable. If, on the other hand, the operator platform roof has a fixed height position, it is also possible and expedient in this case to provide only one single pull-out position for the flexible lateral wall element. The pull-out position thus designates a position of the flexible lateral wall element in which the latter effects at least partial lateral weather protection for the operator on the operator platform.

According to one embodiment of the present invention, the adjustment of the flexible lateral wall element from the pull-out position to the pull-in position is done via the pull-in device. The pull-in device herein thus designates the sum of the parts that cooperate specifically to effect the automatic movement of the flexible lateral wall element from the respective pull-out position to the pull-in position. What is essential here is that the pull-in device has a constructive design such that it includes a driven adjusting device, i.e., a discrete adjusting drive, via which the adjusting movement of the flexible lateral wall element of the lateral weather protection device from the pull-out position to the pull-in position is driven. This means that it is not required to resort to energy from the conventional energy supply system of the construction machine or a manual drive by the operator. According to one embodiment of the present invention, the specific adjustment of the flexible lateral wall element from the pull-out position to the pull-in position is thus done via a dedicated drive of the adjusting device of the pull-in device. The pull-in device is in this case designed such that it pulls the flexible lateral wall element in to the pull-in position. With the aid of the adjusting device of the pull-in device, a tension force acting in the direction of the pull-in position is thus exerted on the flexible lateral wall element when the latter is in the pull-out position.

Provision is further made for the pull-in device to include a releasable holding device which, when in a holding position, is designed to hold the flexible lateral wall element in at least the pull-out position. The holding device thus constitutes an arresting device device for the pull-in device the main task of which is to ensure that the flexible lateral wall element is held in the desired pull-out position and is thus prevented, for example, from inadvertently springing from the pull-out position to the pull-in position. In the holding position, the holding device thus locks the flexible lateral wall element in its respective pull-out position and thus counteracts the tension force built up by the pull-in device and acting on the flexible lateral wall element in the direction of the pull-in position. However, once the holding position of the holding device is released, the pull-in device drives the restoration of the flexible lateral wall element to the pull-in position in a self-driven manner.

With the aid of the assembly according to one embodiment of the present invention, it is thus possible, on the one hand, for an operator on the operator platform to use a lateral weather protection or to easily restore the latter to a stowage position as desired. This is achieved with relatively simple constructive means and, in addition, enables omission of an expensive cab.

It is advantageous if the flexible lateral wall element consists at least partially of a transparent flexible material, in particular a transparent plastic material, more particularly plasticized PVC. This has the advantage that the field of vision of the driver on the operator platform is not or at least only very slightly restricted by the flexible lateral wall element even when the latter is in its pull-out position. The driver can instead see through the flexible lateral wall element.

The driven adjusting device is preferably designed such that it keeps the flexible lateral wall element tensioned in the direction of the pull-in position when it is in the pull-out position. The adjusting device thus permanently exerts a tension force acting in the direction of the pull-in position on the flexible lateral wall element. In this manner, it is ensured that the flexible lateral wall element is always relatively tautly tensioned when it is in the pull-out position. It is thus advantageous if the adjusting device and its drive are designed such that they always exert a tension force acting in the direction of the pull-in position on the flexible lateral wall element.

The specific design of the drive of the driven adjusting device may generally vary. In one embodiment, the drive enables an automatic adjustment of the flexible lateral wall element to the pull-in position. It is particularly preferred that the driven adjusting device includes to this end a mechanical pretensioning device which is designed such that it acts on the flexible lateral wall element in the direction of the pull-in position and builds up an increasing elastic force (tension force or compressive force) when the flexible lateral wall element is adjusted from the pull-in position to the pull-out position. To this end, use is made, in particular, for example, of a suitable spring mechanism with a tensioning or compressing means, in particular a torsion spring mechanism, for example with a spiral or torsion spring, or a torsion bar. Such mechanical, in particular purely mechanical, pretensioning devices are advantageous in that they can be realized in a relatively simple manner and also function very reliably.

It is generally possible to design and support the flexible lateral wall element such that, when being adjusted from the pull-out position to the pull-in position, it is adjusted, and, in particular, rolled in, in the horizontal direction or in the vertical direction top down. It is, however, particularly favorable to suspend the flexible lateral wall element such that it is adjusted, and, in particular, rolled in or rolled up, from the pull-out position to the pull-in position bottom up in the vertical direction. It has proven to be particularly advantageous here if the pull-in device is arranged at the operator platform roof, i.e., in the upper end region of the operator platform. Although this may generally be done using a separate support link to the machine frame or the operator platform floor, the pull-in device is then preferably arranged at a roof shell of the operator platform roof and/or a roof frame of the operator platform roof via an attachment device, in particular directly. This enables, on the one hand, a relatively tight upper termination towards the operator platform roof when the flexible lateral wall element is in its pull-out position. On the other hand, in terms of operability, it is more comfortable for the driver to pull the flexible lateral wall element downwards than in another direction when adjusting it from the pull-in position to the pull-out position.

The pull-in position is essentially characterized by the fact that the flexible lateral wall element is, on the one hand, arranged in a space-saving manner and, on the other hand, does not cover the respective arrangement side, i.e., does not enable protection towards the outside in this case. Such a space-saving arrangement may be obtained, for example, by a state in which the flexible lateral wall element is gathered or folded in the pull-in position. It is, however, particularly favorable to roll the flexible lateral wall element up towards the pull-in position. The pull-in device is therefore preferably a roll-in device with which the flexible lateral wall element is rolled up towards the pull-in position at least partially about a roll-in axis. The roll-in axis thus designates an axis of motion about which the rolled-up part of the flexible lateral wall element can be rolled up and unrolled. To this end, a physical support axle may additionally be provided which extends along the roll-in axis and around which the flexible lateral wall element is rolled up. It is, however, also possible to omit such a support axle and achieve controlled rolling up and unrolling of the flexible lateral wall element, for example, via roll-up jaws resting laterally against the flexible lateral wall element.

The pull-in device, and, in particular, the roll-in device, is arranged in one embodiment at the roof shell of the operator platform roof and/or the roof frame of the operator platform roof such that it is covered by parts of the operator platform roof across the width of the flexible lateral wall element along the roll-in axis, in particular also when the flexible lateral wall element is in its pull-in position. In this embodiment, the operator platform roof thus covers the roll-in device towards the top and preferably also at least partially towards the external side. This is preferred, in particular, also for aesthetic reasons. This may even go as far as arranging the roll-in device at the roof shell of the operator platform roof and/or the roof frame of the operator platform roof such that it does essentially not project beyond the lower edge of the operator platform roof and, in particular, the roof shell, in particular when the flexible lateral wall element is in the roll-in position.

To prevent the flexible lateral wall element from inadvertently being retracted, in particular rolled in, beyond a particular point, i.e., a defined pull-in position, the pull-in device, and, in particular, the roll-in device, preferably includes a limiting stop such that the latter interacts with the flexible lateral wall element or a part connected to it so as to limit the movement of the flexible lateral wall element in the direction of the pull-in position. For this, a fixed stop element, for example a stop bead, may be arranged, for example, at the flexible lateral wall element, in particular at its bottom end edge in the pull-in direction, which strikes in the pull-in direction against a suitable complementary stop, for example at the operator platform roof or a part of the pull-in device, and is thereby prevented from continuing in the pull-in direction. This end stop may, in particular, also be part of a handle arranged at the flexible lateral wall element.

The specific design of the releasable holding device of the pull-in device may also vary. According to one embodiment of the present invention, the main task of the releasable holding device is to ensure that the flexible lateral wall element is held in the pull-out position. This applies, in particular, in cases where the flexible lateral wall element is always tensioned or compressed in the direction of the pull-in position by the pull-in device. It is therefore preferred that the releasable holding device at least includes a pair of interacting holding elements, one holding element being arranged at the lateral wall element, in particular at its bottom edge, and the other holding element being arranged at the operator platform and/or the machine frame. The two holding elements of said pair of holding elements can thus interact with one another, thereby holding the flexible lateral wall element in the pull-out position. To this end, the specific design may include, for example, a magnetic holder which enables a releasable adhesive connection due to magnetic interaction. For this, a metal element, for example a metal plate, may be provided, for example, at the flexible lateral wall element, which may be held by a magnet located at the operator platform, or vice versa. Additionally, or alternatively, the holding device may also comprise a form-locking holder, with which the releasable holding connection is achieved via holding elements that can be locked together in a form-locking manner. To this end, the form-locking holder may include, for example, a holding hook, a holding eyelet, a holding bracket, etc. Additionally, or alternatively, it is further also possible that the holding device comprises, for example, a clamping holder, in particular a clamping rail. Such a clamping rail may include two holding jaws between which, for example, a part of the flexible lateral wall element may be clamped. What is important is that the holding force that can be applied with the holding device is larger than the tensile restoring force exerted by the adjusting device and acting on the flexible lateral wall element in the direction of the pull-in position.

The advantages of the present invention become particularly apparent when the operator platform roof is height adjustable. Due to the fact that the flexible lateral wall element is preferably tensioned in the direction of the pull-in position by the pull-in device, the pull-out position of the flexible lateral wall element desired for the respective height position of the operator platform roof independently adapts itself according to a height adjustment of the operator platform roof.

It is also advantageous if the operator platform roof is laterally adjustable with respect to the operator platform and/or the machine frame, and that the releasable holding device may have different holding positions depending on the lateral adjustment position of the operator platform roof. Laterally adjustable herein thus refers to a horizontal adjustment, in particular displacement, of the operator platform roof, for example to achieve improved weather protection conditions on the right- or left-hand side of the construction machine in the working direction of the construction machine. This may also comprise an adjustment in and against the working direction. In order to also enable a simple utilization of the flexible lateral wall element in various lateral positions of the operator platform roof, according to one embodiment of the present invention, the holding device is now preferably designed such that it is possible to attach the flexible lateral wall element via one and the same holding device in the various possible lateral positions of the operator platform roof. To this end, the holding device may, in particular, include a holding element which extends longitudinally across the lateral adjustment range of the operator platform roof or at least in the direction of the lateral adjustment range. This longitudinally extending holding element is preferably not arranged at the flexible lateral wall element but, in particular, at the operator platform and/or the machine frame of the construction machine. Such a longitudinally extending holding element may be, for example, a magnet and/or hook bead, or a longitudinally extending holding bracket and/or holding rail. A corresponding complementary element, for example a metal rail or a holding hook, which interacts with the longitudinally extending holding element to maintain the holding connection, in particular, for example, by forming a form lock, is then provided at the flexible lateral wall element, in particular at its sublayers.

In the case of a road milling machine, in particular a milling machine of the rear rotor type, this longitudinally extending holding element is most preferably arranged at a rear stripper guide. Such a stripper guide is disclosed, for example, in DE 102013006105A1, which is herewith also incorporated herein by reference. The stripper guide serves to enable lifting and lowering of a rear stripping plate of a milling drum box. The rear stripper guide then usually protrudes beyond the operator platform floor of the operator platform and at least partially forms the rear boundary of the operator platform in the milling direction of the road milling machine. The longitudinally extending holding element can be arranged at this location in a particularly favorable manner as it neither obstructs the view to a significant degree nor affects the operating comfort for the operator there.

It is generally possible that the flexible lateral wall element can form a rear wall, a front wall and/or a weather protection wall of the operator platform extending on the right- and/or left-hand side of the construction machine. In particular, in the case of construction machines of the road milling machine type, more particularly milling machines of the rear rotor type, however, the flexible lateral wall element is arranged on the operator platform such that, when in the pull-out position, it covers the rear side of the operator platform or forms at least a part of a rear wall of the operator platform.

The present invention further also comprises embodiments in which at least two flexible lateral wall elements are provided on different sides of the construction machine, for example on the right-hand and/or the left-hand side and/or on the front and/or the rear side of the operator platform.

A further aspect of the present invention consists in a method for adjusting a flexible lateral wall element of a lateral weather protection device of a construction machine, in particular a construction machine according to one embodiment of the present invention as described above. Steps of the method according to one embodiment of the present invention consist in adjusting the height of an operator platform roof relative to a machine frame, including to this end at the same time automatically adjusting a pull-out position of the flexible lateral wall element depending on the height position of the operator platform roof, wherein the flexible lateral wall element is adjusted from a pull-out position in the direction of the pull-in position with the aid of a dedicated drive of the pull-in device and independently of a drive for the height adjustment of the operator platform roof. A first aspect of the method according to one embodiment of the present invention thus is that, in particular, the adjustment of the pull-out position is effected automatically and without additional manual intervention when the height of the operator platform roof is adjusted. Further, provision is made for a discrete drive, provided as part of the pull-in device, for adjusting the pull-out position of the flexible lateral wall element in the direction of the pull-in position. The drive energy required for this adjusting movement of the flexible lateral wall element is thus, in particular, provided by the pull-in device itself and not by the adjusting drive for the height adjustment of the operator platform roof. Through this, it is, for example, not necessary to link the pull-in device to an energy source of the construction machine.

Specifically, provision is preferably made for the adjustment of the flexible lateral wall element from a pull-out position to the pull-in position to be driven with the aid of a mechanical pretensioning device, in particular a torsion spring mechanism, which is tensioned when the flexible lateral wall element is adjusted from the pull-in position to a pull-out position. Through this, the adjusting movement of the flexible lateral wall element away from the pull-in position is thus utilized for pretensioning the pretensioning device. The pretensioning device is thus a kind of energy storage the stored energy of which is utilized for returning the flexible lateral wall element in the direction of the pull-in position, i.e., for driving the returning movement of the flexible lateral wall element to the pull-in position.

In the pull-in position, the flexible lateral wall element ideally assumes a space-saving position. This is achieved particularly effectively by rolling the flexible lateral wall element up about a roll-in axis to adjust the flexible lateral wall element from the pull-out position to the pull-in position.

BRIEF DESCRIPTION OF THE DRAWINGS

The present invention will be described in more detail below by reference to the embodiment examples shown in the figures. In the schematic figures.

Like components are designated by like reference numerals, although recurring reference numerals may not necessarily be indicated separately in each figure.

DETAILED DESCRIPTION OF THE INVENTION

Figure 1:
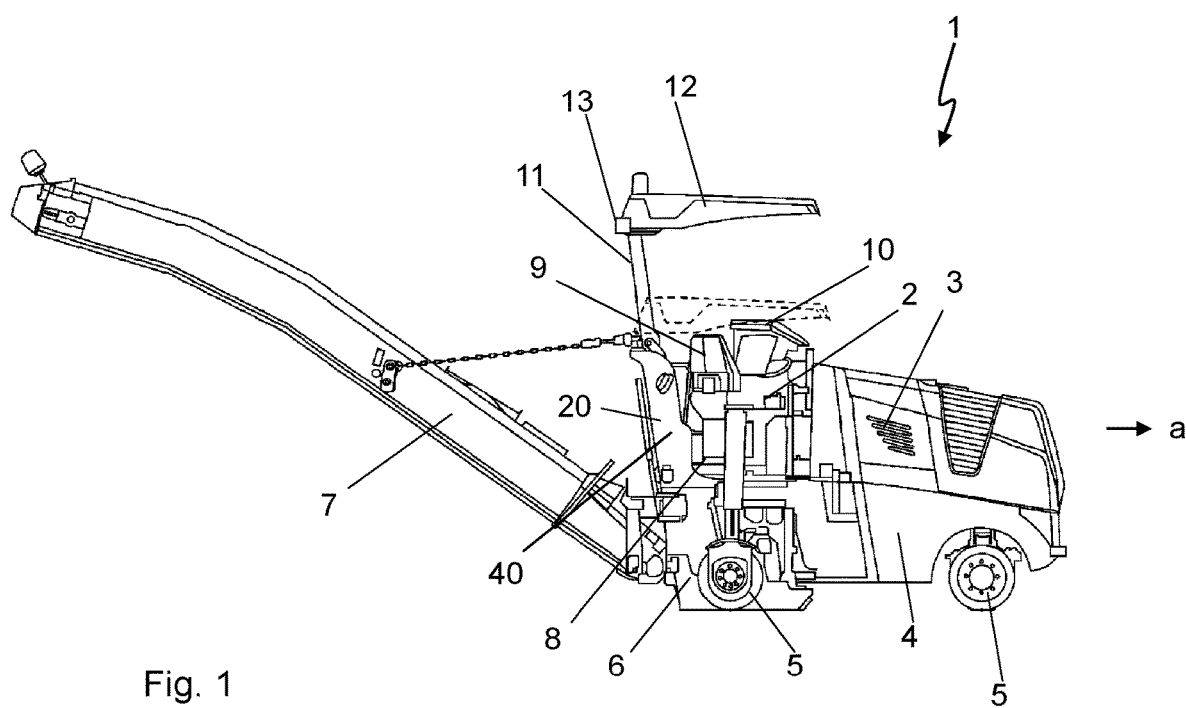
FIG. 1 is a side view of a construction machine of the road cold milling machine type.

FIG. 1 shows an exemplary self-propelled construction machine 1. Elements of the construction machine 1 consist in an operator platform 2, a drive engine 3, a machine frame 4 as well as traveling devices 5. More specifically, the construction machine 1 is a road construction machine of the rear-rotor road milling machine type. It comprises, as a working device, a milling device 6 designed in a known manner with a milling drum mounted for rotation about a rotation axis extending horizontally and transversely to the working direction inside a milling drum box, as well as a loading conveyor belt 7 for loading milled material. The construction machine 1 is operated by an operator on the operator platform 2. The operator platform 2 includes an operator platform floor 8, a driver seat 9, a control station 10 as well as an operator platform roof 12 supported via a support member 11. The operator platform roof 12 is height-adjustable, the lowered position being indicated by dashed lines in FIG. 1. The operator platform roof 12 further includes a lateral weather protection device 13 arranged thereon, the structure and operating mode of which is illustrated in more detail in FIGS. 2 to 7. In working operation, the construction machine 1 moves in the working direction a in a self-propelled manner.

Figure 2A:
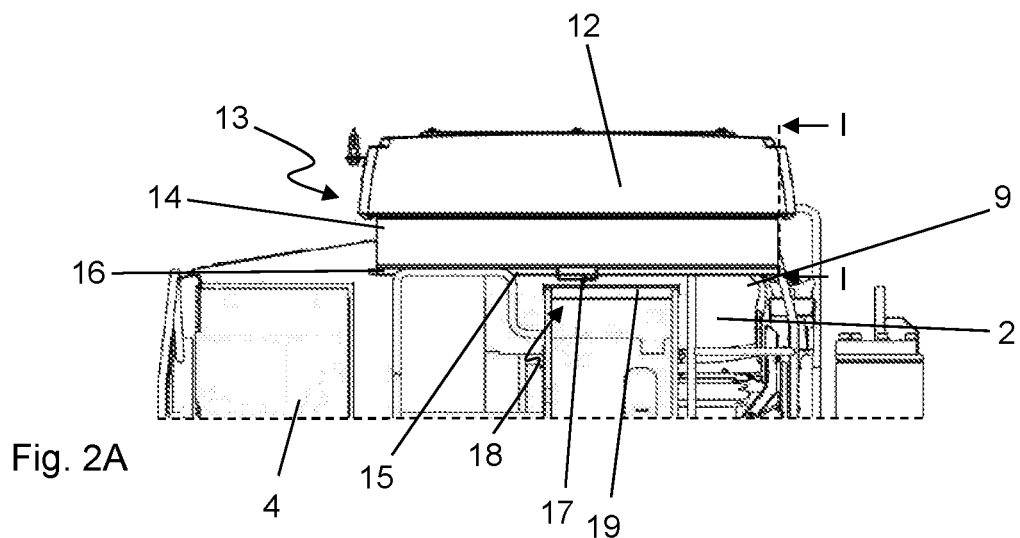
FIG. 2A is a cut-out rear view of the construction machine of FIG. 1 with lowered operator platform roof.
Figure 2B:
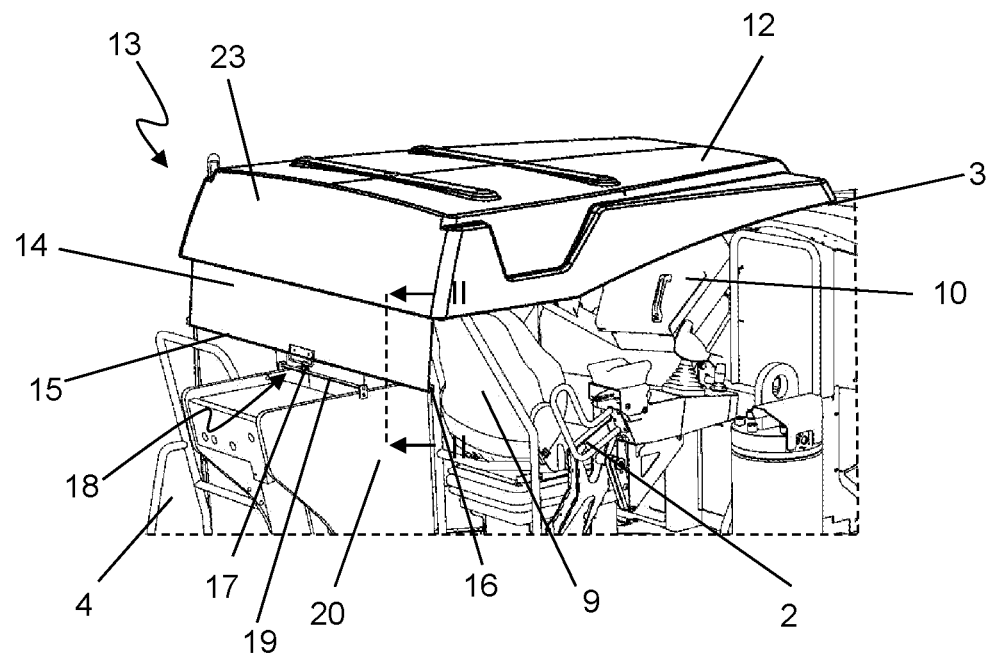
FIG. 2B is a right-hand side oblique perspective rear view of the region of FIG. 2A.
Figure 4A:
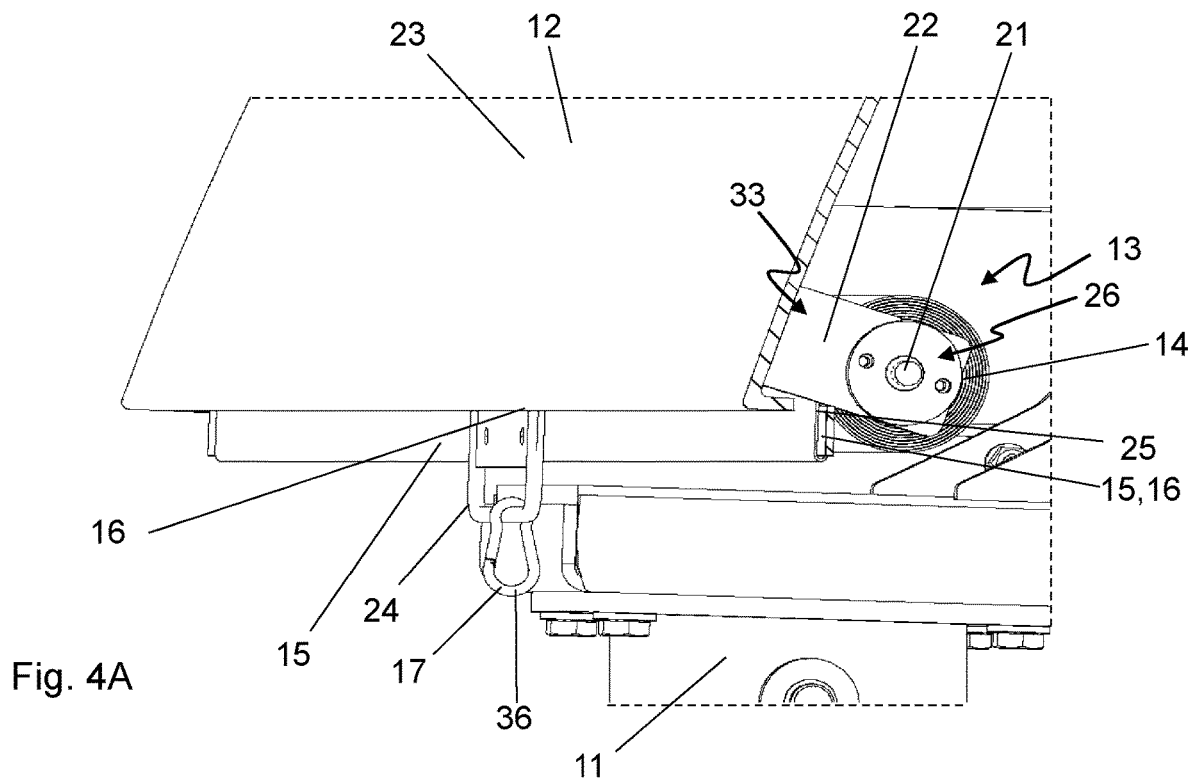
FIG. 4A is a perspective cross-sectional cut-out view with a section plane transverse to a roll-in axis of the pull-in device with a lateral wall element in the pull-in position according to line I-I of FIG. 2A.
Figure 4B:
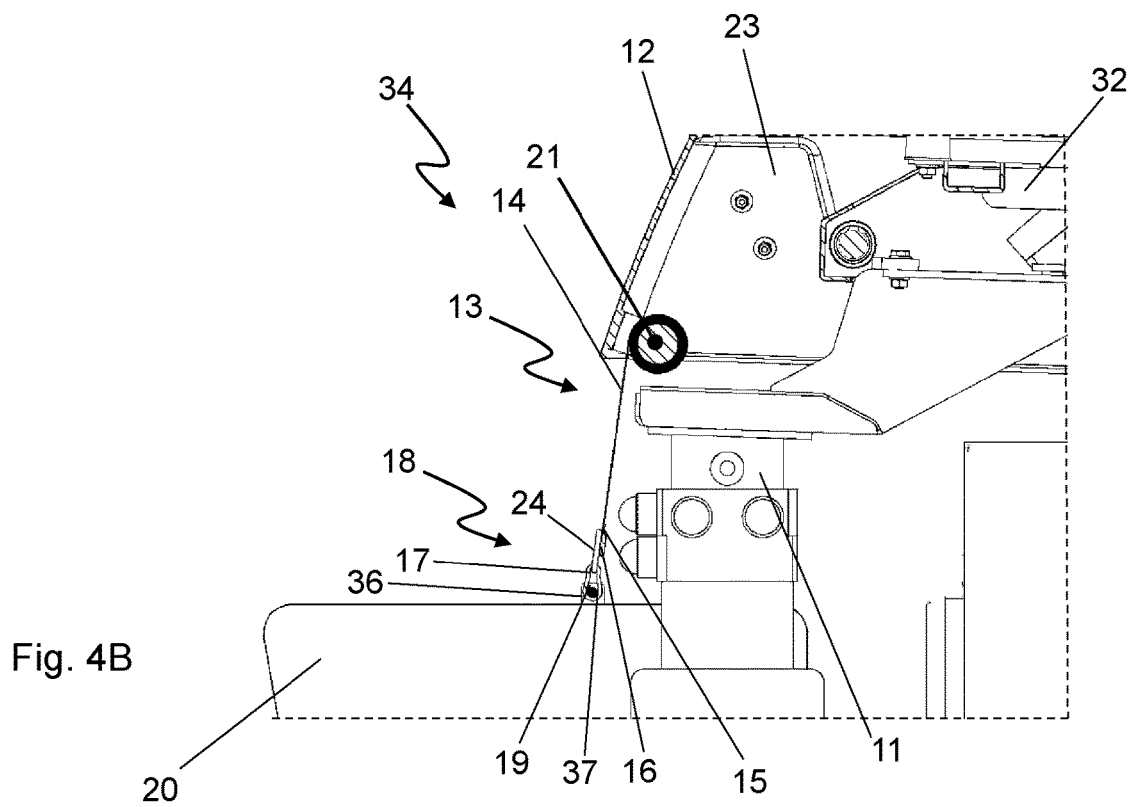
FIG. 4B is a cross-sectional cut-out view transverse to a roll-in axis of the pull-in device with a lateral wall element in a pull-out position according to line II-II of FIG. 2B.
Figure 5:
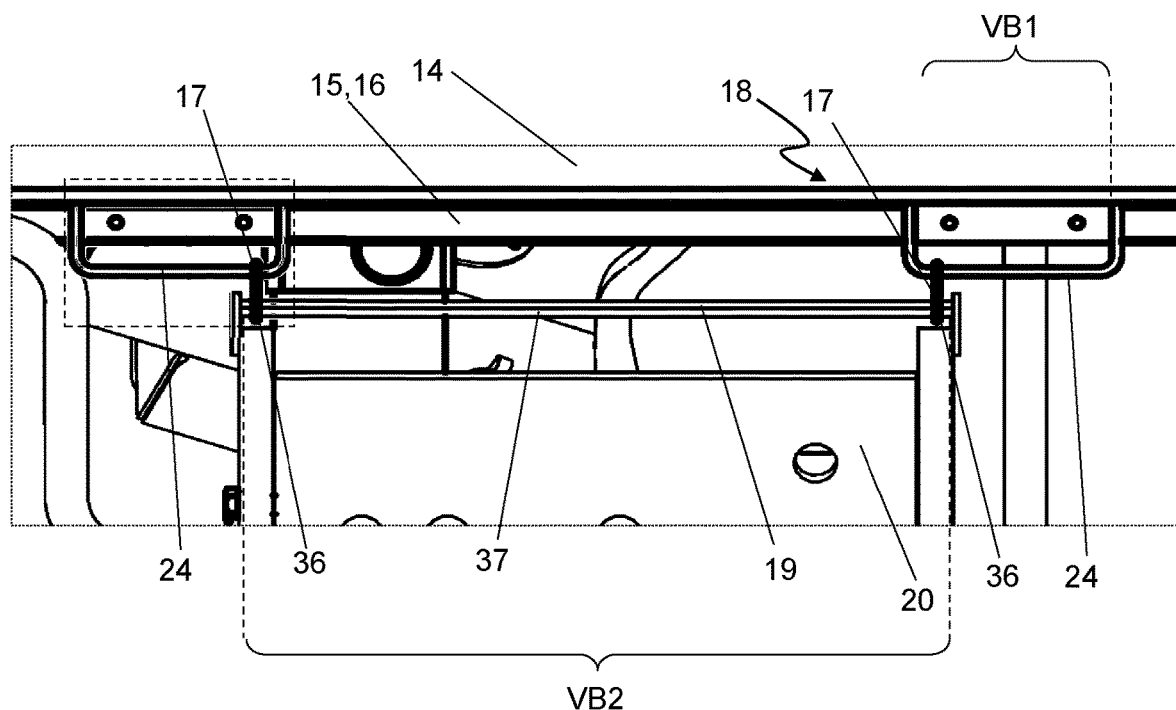
FIG. 5 is an enlarged cut-out view of the region III of FIG. 3A.

In FIGS. 2A and 2B, the operator platform roof 12 is shown in the lowered position (corresponding to the position indicated by dashed lines in FIG. 1). A flexible lateral wall element 14 as part of the lateral weather protection device 13 is shown in the rear region of the operator platform roof 12. In FIGS. 2A and 2B, this flexible lateral wall element 14, which essentially consists of a transparent plastic material, is in a pull-out position. For this, the flexible lateral wall element 14 includes at its bottom edge 15 a reinforcing bead 16 from which a spring hook 17, as part of a holding device 18 described in more detail, in particular, in FIGS. 4A, 4B and 5, is suspended via a bracket-like handle 24. The spring hook 17 is hooked into a holding bracket 19 (or holding rail) extending horizontally and transversely to the working direction a at a rear stripper guide 20 in the rear region of the operator platform 2.

Figure 3A:
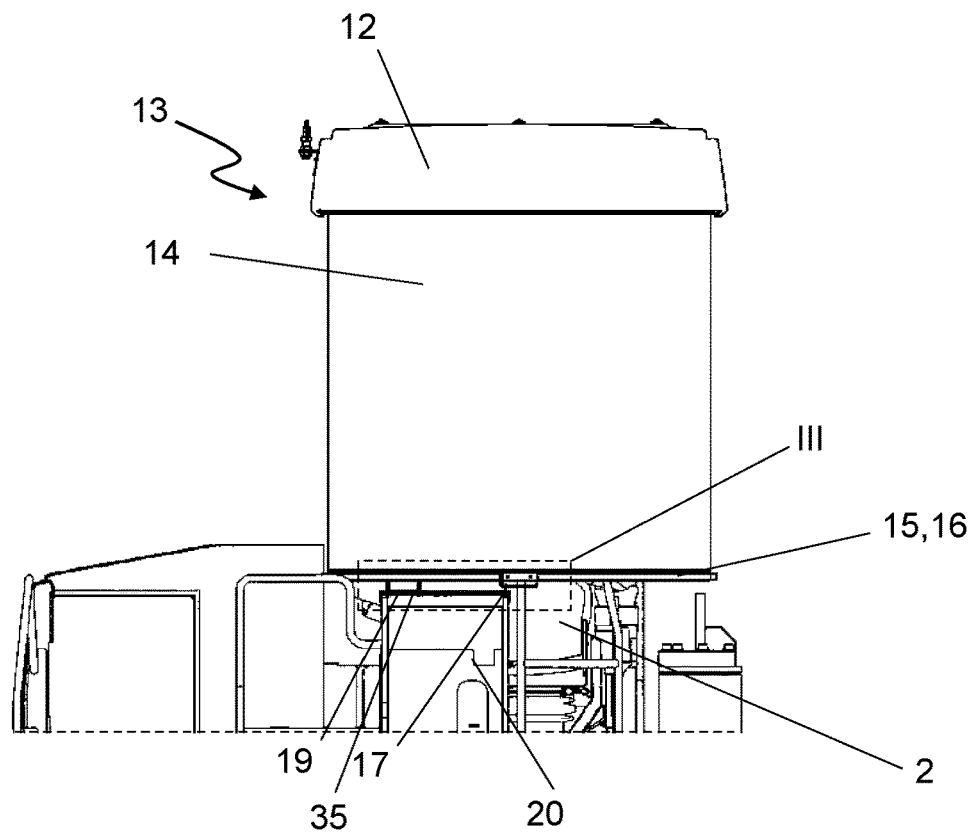
FIG. 3A is a cut-out rear view of the construction machine of FIG. 1 with lifted operator platform roof and a lateral wall element in a pull-out position.
Figure 3B:
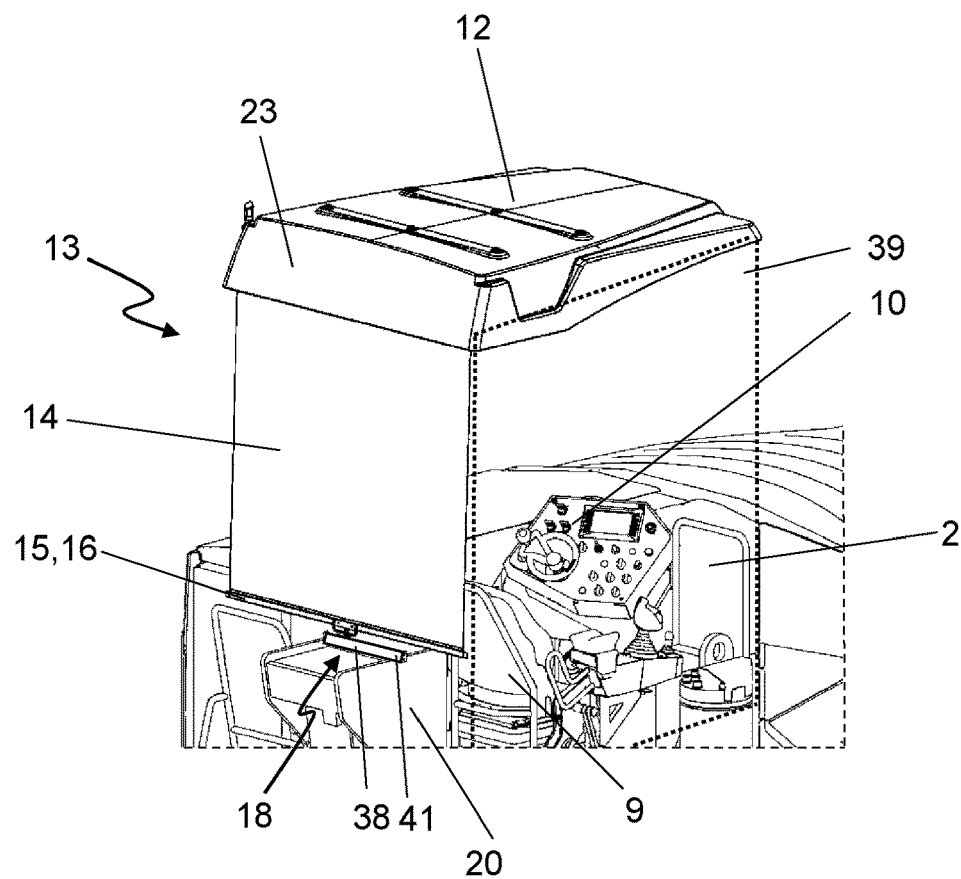
FIG. 3B is a right-hand side oblique perspective rear view of the region of FIG. 3A.

FIGS. 3A and 3B show the construction machine of FIGS. 2A and 2B, in this case with the operator platform roof 12 in a lifted position. Thus, the flexible lateral wall element 14 is here in a pull-out position in which it is extended farther than in FIGS. 2A and 2B. The holding bracket 19 extending horizontally and transversely to the working direction includes a magnetic holder 35 which enables a releasable adhesive connection due to magnetic interaction. Additionally, the holding device comprises a clamping holder 38, in particular a clamping rail 41.

The cross-sectional view of FIG. 4A along line I-I of FIG. 2A (in which the attachment to the holding bracket is released) illustrates the basic structure and the essential elements of the lateral weather protection device 13 in further detail. In FIG. 4A, the flexible lateral wall element 14, which consists, for example, of a plasticized PVC, is shown in the pull-in position. In the present embodiment example, the flexible lateral wall element 14 is in this state rolled up about a roll-in axle 21. A respective holding plate 22 (more specifically a holding angle), which is attached to the inner side of a roof shell 23 of the operator platform roof 12 supported at a roof frame 32, is in each case provided in the axial direction of the roll-in axle 21 in front of and behind the flexible lateral wall element 14. The roof shell 23 consists, for example, of a glass-fiber reinforced plastic material. The holding plate 22 thus protrudes with a support arm from the inner wall of the roof shell 23. The reinforcing bead 16, which protrudes beyond the flexible lateral wall element 14 on both sides in the axial direction of the roll-in axle, here forms a roll-in stop 25 or limiting stop which limits the roll-in movement of the flexible lateral wall element 14 in the direction of the pull-in position shown in FIG. 4A. For this, the roll-in stop strikes against the bottom edge of the holding plate 22.

The roll-in movement in the direction of the pull-in position is achieved via a torsion spring mechanism 26, which is not shown in further detail. Said torsion spring mechanism is designed such that it triggers a rotation of the roll-in axle 21 in the direction of the pull-in position upon release of a torsion spring, which thus constitutes the drive of the entire adjusting device 34. If, on the other hand, the flexible lateral wall element 14 is pulled out from the pull-in position shown in FIG. 4A, the torsion spring mechanism 26 builds up an increased pretension which is utilized to drive the restoring movement of the flexible lateral wall element 14. The cooperation of, in particular, the elements 16, 25 and 26 here represents the essential function of the pull-in device 33.

FIG. 4B shows a cross-sectional view along section line II-II of FIG. 2B. FIG. 4B, in particular, shows the linkage of the spring hook 17 to the holding bracket 19, a hook bead 37, which together form the attachment device. In FIG. 4B, the flexible lateral wall element 14, 39 is to this end pulled out from its pull-in position to a pull-out position. The torsion spring mechanism 26 described above ensures that the flexible lateral wall element 14 is tensioned and thus kept under tension. If the operator platform roof 12 is now lifted from the lowered position shown in FIG. 4B, as shown, for example, in FIGS. 3A and 3B, the lateral weather protection device 13 compensates this adjusting movement by pulling the lateral wall element 14 out further without additional manual measures (with the torsion spring mechanism 26 described above being tensioned additionally and thus storing additional energy), as will be done when the operator platform roof 12 is subsequently retracted again (with the described torsion spring mechanism 26 then driving the rolling-in of the flexible lateral wall element 14). Thus, as long as the flexible lateral wall element 14 is held in a pull-out position via the holding device 18, the lateral weather protection wall 13 thus automatically has the optimum pull-out position for the respective height position of the operator platform roof 12.

As is further illustrated, in particular, by a comparison of FIGS. 2A and 3A, the specific design of the lateral weather protection device 13 also allows lateral adjustment of the operator platform roof 12 or the roof shell 23. In FIG. 2A, the roof shell 23 of the operator platform roof 12 is shown in an essentially central position relative to the remaining construction machine 1. In FIG. 3A, by contrast, the roof shell 23 is shifted towards the right-hand longitudinal side of the construction machine 1. The specific design of the holding device 18 compensates this lateral adjustment such that the holding device 18 does not need to be released and the flexible lateral wall element 14 can be kept in a pull-out position in the case of lateral adjustment.

For further illustration in this regard, reference is made, in particular, to FIG. 5, which shows the framed region III of FIG. 3A greatly enlarged. On the right-hand side, the handle 24 can be seen in the position shown in FIG. 3A assumed when the operator platform roof 12 is shifted to the right by a maximum distance. On the left-hand side, the same handle 24 is, in a brighter illustration, further shown in its position assumed when the operator platform roof 12 is shifted to the left by a maximum distance. A first thing that can be seen is that the bracket-like handle 24 is connected to the holding bracket 19 in a form-locking manner via the spring hook 17 thus, comprising a form-locking holder 36. This ensures that the flexible lateral wall element 14 is not inadvertently rolled in, upwards in FIG. 5, to the pull-in position by the tension force generated via the adjusting drive (torsion spring mechanism 26) but is instead held in the pull-out position. The spring hook 17 can then be adjusted across the adjustment range VB1 along the handle 24, or its bracket, which extends longitudinally in the direction of adjustment of the operator platform roof 12 during a lateral adjustment, without having to release the holding connection of the holding device 18 for this. At the same time, however, the spring hook 17 can also be adjusted across the adjustment range VB2 along the holding bracket 19, which likewise extends longitudinally in the direction of lateral adjustment, without having to release the holding connection of the holding device 18 for this. Overall, the present design thus allows a maximum lateral adjustment of VB1+VB2. This overall adjustment range is in this case at least as large as the maximum lateral adjustment distance of the operator platform roof 12.

Figure 6:
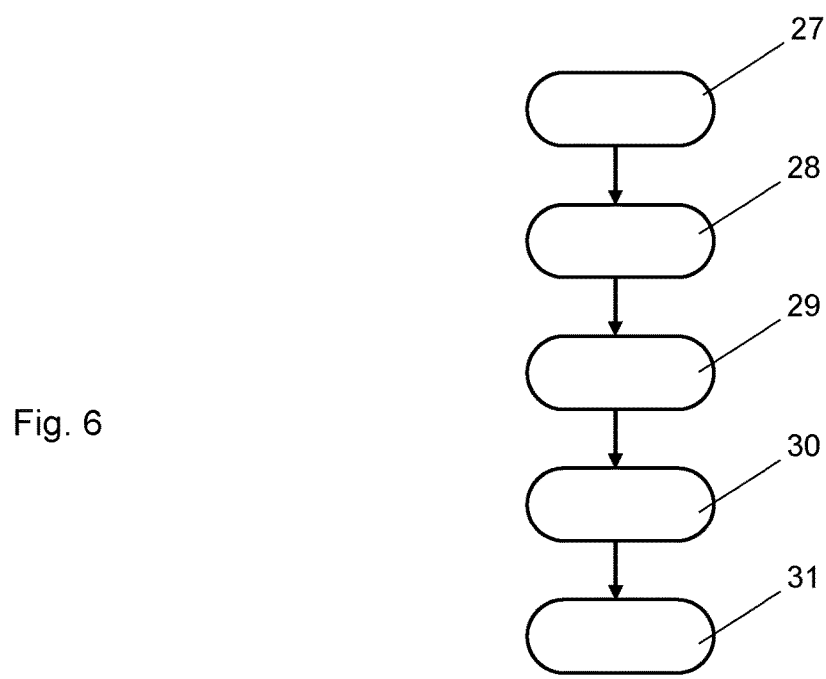
FIG. 6 is a flow chart of a method according to the present invention.

FIG. 6 finally illustrates, in a flow chart, the steps of a method for adjusting a flexible lateral wall element adjustable between a pull-in position and a pull-out position, which is part of a lateral weather protection device of a construction machine, in particular a construction machine as described in the above embodiment example. Provision is made here for automatic adjustment (28) of a pull-out position of the flexible lateral wall element depending on the height position of an operator platform roof upon adjustment (27) of the height of said operator platform roof relative to a machine frame. The flexible lateral wall element is in this case adjusted from a pull-out position in the direction of the pull-in position with the aid of a dedicated drive of the pull-in device, i.e., by driving (29) performed discretely and independently of a drive 40 for the height adjustment of the operator platform roof. The adjustment of the flexible lateral wall element from a pull-out position to the pull-in position is then optimally driven with the aid of a mechanical pretensioning device, in particular a torsion spring mechanism, wherein the flexible lateral wall element is then ideally tensioned (30) during adjustment from the pull-in position to a pull-out position and released during a movement in the opposite direction. Adjustment of the flexible lateral wall element from the pull-out position to the pull-in position is preferably achieved by rolling the flexible lateral wall element up (31) about a roll-in axis.

While the present invention has been illustrated by description of various embodiments and while those embodiments have been described in considerable detail, it is not the intention of Applicants to restrict or in any way limit the scope of the appended claims to such details. Additional advantages and modifications will readily appear to those skilled in the art. The present invention in its broader aspects is therefore not limited to the specific details and illustrative examples shown and described. Accordingly, departures may be made from such details without departing from the spirit or scope of Applicants' invention.

What is claimed is:

1. A construction machine, comprising:
a machine frame;
an operator platform arranged on said machine frame with an operator work-place, an operator platform roof which is height-adjustable, and a vertically extending lateral weather protection device for an operator located on the operator platform,
wherein the lateral weather protection device comprises a flexible lateral wall element and a pull-in device,
wherein the lateral wall element is adjustable between a pull-in position and a pull-out position with the aid of the pull-in device,
wherein the pull-in device includes a driven adjusting device for automatic adjustment of the lateral weather protection device from a pull-out position in the direction of the pull-in position,
wherein the pull-in device includes a releasable holding device which, when in a holding position, is designed to hold the flexible lateral wall element in the pull-out position, and
wherein the operator platform roof is laterally adjustable with respect to the operator platform and/or the machine frame, and that the holding device may have different holding positions depending on the lateral adjustment position of the operator platform roof.

2. The construction machine according to claim 1, wherein the pull-in device is arranged at the operator platform roof.

3. The construction machine according to claim 1, wherein the driven adjusting device includes a mechanical pretensioning device which is designed such that the mechanical pretensioning device acts on the flexible lateral wall element in the direction of the pull-in position.

4. The construction machine according to claim 1, wherein the pull-in device is arranged at a roof shell of the operator platform roof and/or a roof frame of the operator platform roof via an attachment device.

5. The construction machine according to claim 1, wherein the pull-in device is a roll-in device with which the flexible lateral wall element is rolled up towards the pull-in position at least partially about a roll-in axis.

6. The construction machine according to claim 5, wherein the roll-in device is arranged at the roof shell of the operator platform roof and/or the roof frame of the operator platform roof such that the roll-in device is covered by parts of the operator platform roof across the width of the flexible lateral wall element along the roll-in axis.

7. The construction machine according to claim 5, wherein the roll-in device is arranged at the roof shell of the operator platform roof and/or the roof frame of the operator platform roof such that the roll-in device does essentially not project beyond the lower edge of the operator platform roof when the flexible lateral wall element is in the roll-in position.

8. The construction machine according to claim 5, wherein the roll-in device includes a limiting stop such that the limiting stop interacts with the flexible lateral wall element so as to limit the movement of the flexible lateral wall element in the direction of the pull-in position.

9. The construction machine according to claim 1, wherein the flexible lateral wall element at least partially consists of a transparent material.

10. The construction machine according to claim 1, wherein the releasable holding device comprises at least one of the following features:
the releasable holding device comprises at least one pair of interacting holding elements, one holding element being arranged at the lateral wall element and the other holding element being arranged at the operator platform and/or the machine frame;
the releasable holding device includes a magnetic holder;
the releasable holding device includes a form-locking holder with at least one holding hook and/or one holding hook bead; and
the releasable holding device includes a clamping holder.

11. The construction machine according to claim 1, wherein the holding device comprises a holding rail which extends in the direction of the lateral adjustability of the operator platform roof and is arranged stationary with respect to the operator platform floor.

12. The construction machine according to claim 1, wherein the flexible lateral wall element is a rear wall or a wall extending on the right- or left-hand side of the construction machine.

13. The construction machine according to claim 1, wherein at least two flexible lateral wall elements are provided on different sides of the construction machine.

14. A method for adjusting a flexible lateral wall element adjustable between a pull-in position and a pull-out position, which is part of a lateral weather protection device of a construction machine according to claim 1, comprising the steps of:
a) adjusting the height of an operator platform roof relative to a machine frame;

b) automatically adjusting a pull-out position of the flexible lateral wall element depending on the height position of the operator platform roof concurrently with step a); and
c) wherein the flexible lateral wall element is adjusted from a pull-out position in the direction of the pull-in position with the aid of a dedicated drive of the pull-in device and independently of a drive for the height adjustment of the operator platform roof.

15. The method according to claim 14,
wherein the adjustment of the flexible lateral wall element from a pull-out position to the pull-in position is driven with the aid of a mechanical pretensioning device which is tensioned when the flexible lateral wall element is adjusted from the pull-in position to a pull-out position.

16. The method according to claim 14,
wherein the flexible lateral wall element is rolled up about a roll-in axis to adjust the flexible lateral wall element from the pull-out position to the pull-in position.

17. The construction machine of claim 3,
wherein the mechanical pretensioning device comprises a torsion spring mechanism.

18. The construction machine of claim 9,
wherein the transparent material comprises a plasticized PVC.

19. The construction machine of claim 10,
wherein the clamp holder comprises a clamping rail.

20. A construction machine, comprising:
a machine frame;
an operator platform arranged on said machine frame with an operator work-place, an operator platform roof which is height-adjustable, and a vertically extending lateral weather protection device for an operator located on the operator platform,
wherein the lateral weather protection device comprises a flexible lateral wall element and a pull-in device,
wherein the lateral wall element is adjustable between a pull-in position and a pull-out position with the aid of the pull-in device,
wherein the pull-in device includes a driven adjusting device for automatic adjustment of the lateral weather protection device from a pull-out position in the direction of the pull-in position,
wherein the pull-in device includes a releasable holding device which, when in a holding position, is designed to hold the flexible lateral wall element in the pull-out position, and
wherein the releasable holding device comprises at least one of the following features:
the releasable holding device comprises at least one pair of interacting holding elements, one holding element being arranged at the lateral wall element and the other holding element being arranged at the operator platform and/or the machine frame;
the releasable holding device includes a magnetic holder;
the releasable holding device includes a form-locking holder with at least one holding hook and/or one holding hook bead; and
the releasable holding device includes a clamping holder.

21. The construction machine of claim 20,
wherein the clamp holder comprises a clamping rail.

* * * * *